United States Patent
Su

(10) Patent No.: US 11,875,080 B2
(45) Date of Patent: Jan. 16, 2024

(54) OBJECT SHARING METHOD AND APPARATUS

(71) Applicant: Beijing SuperHexa Century Technology CO. Ltd., Beijing (CN)

(72) Inventor: Shaohua Su, Beijing (CN)

(73) Assignee: BEIJING SUPERHEXA CENTURY TECHNOLOGY CO. LTD., Beijing (CN)

( * ) Notice: Subject to any disclaimer, the term of this patent is extended or adjusted under 35 U.S.C. 154(b) by 218 days.

(21) Appl. No.: 17/512,502

(22) Filed: Oct. 27, 2021

(65) Prior Publication Data

US 2022/0253269 A1 Aug. 11, 2022

(30) Foreign Application Priority Data

Feb. 8, 2021 (CN) .......................... 202110172525.3

(51) Int. Cl.
*G09G 5/00* (2006.01)
*G06F 3/14* (2006.01)
*A63F 13/533* (2014.01)
*G02B 27/00* (2006.01)
*G02B 27/01* (2006.01)

(52) U.S. Cl.
CPC .......... *G06F 3/1454* (2013.01); *A63F 13/533* (2014.09); *G02B 27/0093* (2013.01); *G02B 27/0101* (2013.01); *G02B 2027/0141* (2013.01)

(58) Field of Classification Search
CPC . G06F 3/1454; A63F 13/533; G02B 27/0093; G02B 27/0101
USPC ......................................................... 345/1.1
See application file for complete search history.

(56) References Cited

U.S. PATENT DOCUMENTS

| 2012/0249416 | A1 | 10/2012 | Maciocci |
| 2017/0053445 | A1* | 2/2017 | Chen .................... H04N 13/398 |
| 2018/0005429 | A1* | 1/2018 | Osman .................... A63F 13/56 |
| 2019/0026950 | A1* | 1/2019 | Sawaki ............... G06F 3/04845 |

(Continued)

FOREIGN PATENT DOCUMENTS

| CN | 107370831 A | 11/2017 |
| CN | 109976690 A | 7/2019 |

(Continued)

OTHER PUBLICATIONS

Extended European Search Report of EP20215758.2.
First Office Action of the priority application CN202110172525.3.

*Primary Examiner* — Jonathan M Blancha
(74) *Attorney, Agent, or Firm* — J.C. PATENTS

(57) ABSTRACT

The present disclosure provides an object sharing method and apparatus. The method can include: receiving target information sent by a second head-mounted device, where the target information is used to indicate a target object contained in a second image collected by the second head-mounted device; generating prompt information for the target object according to a first image collected by a first head-mounted device. Through the technical solution of the present disclosure, users wearing different head-mounted devices can share a target object in a same scenario. When any head-mounted device pays attention to a certain target object, users of other head-mounted devices can be prompted about the target object, improving interaction experience between users.

12 Claims, 13 Drawing Sheets

(56) References Cited

U.S. PATENT DOCUMENTS

2019/0224572 A1\* 7/2019 Leeper ................. G06T 19/006
2019/0272674 A1   9/2019 Comer
2020/0394012 A1   12/2020 Wright, Jr.

FOREIGN PATENT DOCUMENTS

| CN | 110531847 A | 12/2019 |
| CN | 212112404 U | 12/2020 |
| CN | 112261340 A | 1/2021 |
| WO | WO 2017031388 A1 | 2/2017 |

\* cited by examiner

OBJECT SHARING METHOD AND APPARATUS

CROSS-REFERENCE TO RELATED APPLICATION

This application claims priority to Chinese Application No. 202110172525.3, filed on Feb. 8, 2021, the content of which is incorporated herein by reference in its entirety.

TECHNICAL FIELD

The present disclosure relates to the field of network communication technology and, in particular, to an object sharing method and apparatus.

BACKGROUND

With the development of head-mounted devices, shooting functions of the head-mounted devices have also been popularized and promoted. When multiple users wear head-mounted devices to shoot in a same scenario, a lack of real-time interaction between the head-mounted devices makes it difficult for the users to share a target object of interest with each other. And because the head-mounted devices are worn on the users' heads, compared with other handheld devices with shooting functions such as mobile phones and cameras, the users are easily affected by various factors such as vision, hearing and smell, resulting in head rotation or other movement, which thus causes lenses to move therewith, and makes it more difficult for the users to accurately aim the lenses at the target object expected to be shared by a sharer.

SUMMARY

In view of this, the present disclosure provides an object sharing method and apparatus for enabling multiple head-mounted devices to share a shot object in a same scenario, so as to facilitate users to share a target object of interest with each other.

Specifically, the present disclosure is implemented through the following technical solutions.

According to a first aspect of the present disclosure, an object sharing method is proposed. The method is applied to a first head-mounted device, and includes:

receiving target information sent by a second head-mounted device, where the target information is used to indicate a target object included in a second image collected by the second head-mounted device;

generating prompt information for the target object according to a first image collected by the first head-mounted device.

According to a second aspect of the present disclosure, an object sharing method is proposed. The method is applied to a second head-mounted device, and includes:

determining a target object from a second image collected by the second head-mounted device, and acquiring target information corresponding to the target object;

sending the target information to a first head-mounted device, so that the first head-mounted device generates prompt information for the target object according to a collected first image.

According to a third aspect of the present disclosure, an object sharing apparatus is proposed. The apparatus is applied to a first head-mounted device, and includes:

a receiving unit, configured to receive target information sent by a second head-mounted device, where the target information is used to indicate a target object included in a second image collected by the second head-mounted device;

a generating unit, configured to generate prompt information for the target object according to a first image collected by the first head-mounted device.

According to a fourth aspect of the present disclosure, an object sharing apparatus is proposed. The apparatus is applied to a second head-mounted device, and includes:

a determining unit, configured to determine a target object from a second image collected by the second head-mounted device, and acquire target information corresponding to the target object;

a sending unit, configured to send the target information to a first head-mounted device, so that the first head-mounted device generates prompt information for the target object according to a collected first image.

According to a fifth aspect of the present disclosure, an electronic device is provided, including:

a processor;

a memory storing processor executable instructions;

where the processor implements the method according to the embodiments of the first and second aspects above by running the executable instructions.

According to a sixth aspect of embodiments of the present disclosure, a computer-readable storage medium having computer instructions stored thereon is provided, and steps of the method according to the embodiments of the first and second aspects above are implemented when the instructions are executed by a processor.

It can be seen from above technical solutions provided by the present disclosure that in the present disclosure, by sharing the target information of the target object determined by a user, and generating the prompt information for the target object according to the image collected by the head-mounted device, users wearing different head-mounted devices can share the target object in the same scenario, and when any head-mounted device pays attention to a certain target object, users of other head-mounted devices can be prompted about the target object, improving interaction experience between users.

BRIEF DESCRIPTION OF DRAWINGS

The drawings herein are incorporated into and constitute a part of the specification, show embodiments consistent with the present disclosure, and are used together with the specification to explain the principles of the present disclosure.

DESCRIPTION OF EMBODIMENTS

Figure 1:
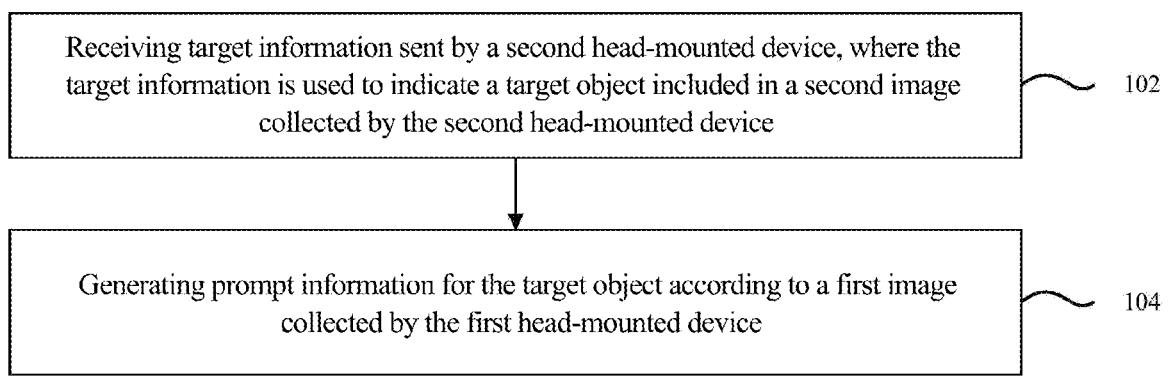
FIG. 1 is a flowchart of an object sharing method according to an exemplary embodiment of the present disclosure.

Exemplary embodiments will be described in detail here, and examples thereof are shown in the drawings. When the following description refers to the drawings, unless otherwise indicated, the same numbers in different drawings represent the same or similar elements. The implementations described in the following exemplary embodiments do not represent all implementations consistent with the present disclosure. Rather, they are only examples of apparatuses and methods consistent with some aspects of the present disclosure as detailed in the appended claims.

The terms used in the present disclosure are only for the purpose of describing specific embodiments, and are not intended to limit the present disclosure. The singular forms "a", "said" and "the" used in the present disclosure and the appended claims are also intended to include plural forms, unless the context clearly indicates other meanings. It should also be understood that the term "and/or" as used herein refers to and includes any or all possible combinations of one or more listed items that are associated.

It should be understood that although the terms "first", "second", "third", and the like may be used to describe various information in the present disclosure, the information should not be limited to these terms. These terms are only used to distinguish the same type of information from each other. For example, without departing from the scope of the present disclosure, first information may also be referred to as second information, and similarly, second information may also be referred to as first information. Depending on the context, the word "if" as used herein can be interpreted as "when" or "while" or "in response to determining that".

Next, the embodiments of the present disclosure will be described in detail.

A head-mounted device can be worn on a user's head to display visual information in the user's field of view to present an image content to the user, and can be expressed in various forms such as glasses, a helmet, a hat, etc., which are not limited in the present disclosure.

FIG. 1 is a flowchart of an object sharing method according to an exemplary embodiment of the present disclosure. As shown in FIG. 1, the method is applied to a first head-mounted device and can include the following steps.

Step 102: receiving target information sent by a second head-mounted device, where the target information is used to indicate a target object included in a second image collected by the second head-mounted device.

In an embodiment, the target information may include: position information of the target object in the second image collected by the second head-mounted device, the position information being acquired by the second head-mounted device when determining the target object; and graphic feature information of the target object, the graphic feature information being acquired by the second head-mounted device when determining the target object, such as outline, color and other information of the target object, so that the first head-mounted device can determine the target object selected by the user in the second head-mounted device according to the received target information. Moreover, it should be understood that a data transmission between the first head-mounted device and the second head-mounted device can be realized through wireless communication methods such as Bluetooth, wife and ZigBee, etc., which is not limited in the present disclosure. For example, the user selects a "boy" as the target object in the second image collected by the second head-mounted device. The second head-mounted device can acquire facial feature information of the "boy" and send the facial feature information to the first head-mounted device as the target information, so that the first head-mounted device can make a query of whether a collected first image includes the target object "boy" according to the facial feature information.

Step 104: generating prompt information for the target object according to a first image collected by the first head-mounted device.

In an embodiment, the prompt information is used to indicate the target object to the user of the first head-mounted device, which may be performed through displaying, playing voice or other forms, or even a combination of multiple methods. The displaying may be displaying text, and may also be displaying a pattern (such as an arrow), or a combination of text and pattern, etc., which is not limited in the present disclosure.

In an embodiment, generating the prompt information for the target object according to the first image collected by the first head-mounted includes: in a case that the first image collected by the first head-mounted device includes the target object, marking the target object in the first image. Marking the target object in the first image may be selecting the target object in the first image using a box, or broadcasting a position of the target object in the first image by voice, which is not limited in the present disclosure. By identifying the target object so that the target object is highlighted in the collected first image, the user wearing the first head-mounted device can notice the identified object and confirm that this object is the target object that the user wearing the second head-mounted device wants to share.

In an embodiment, generating the prompt information for the target object according to the first image collected by the first head-mounted device includes: in a case that the first image collected by the first head-mounted device does not include the target object, generating device movement indication information for the target object, where the indication information is used to indicate moving the first head-mounted device, so that a first image re-collected by the first head-mounted device after moving includes the target object. The case that the first image does not include the target object may be that a shooting content of the first image is completely inconsistent with that of the second image, or may be that the shooting content of the first image includes a part of the shooting content of the second image but does not includes the target object. When the shooting content of the first image includes a part of the shooting content of the second image, a coincident object included in both the first image and the second image is determined, and a position relationship of the target object relative to the first image is determined according to a position relationship between the target object and the coincident object in the second image. For example, the second image shot by the second head-mounted device has a boy and a girl standing side by side. The boy stands on the left side of the girl, and the "boy" is determined as the target object. If the first image shot by the first head-mounted device partially overlaps with the second image, where the target object "boy" is not captured but the "girl" is captured, then according to a position relationship of the boy and the girl in the second image, an arrow indicating to the left can be generated in the first image as the movement indication information to prompt the user to move the first head-mounted device to the left to re-collect the first image including the target object "boy".

In an embodiment, the first image and the second image collected by the head-mounted devices may be a single-frame picture, a video, or a real-time preview image output by a camera, and types of the first image and the second image may be the same or different, which is not limited in the present disclosure. For example, the user of the second head-mounted device can determine the target object from a shot single-frame picture and share it with the first head-mounted device, so that the first head-mounted device can generate the prompt information according to a shot video; or, both the first head-mounted device and the second head-mounted device output a real-time preview image, and the user of the second head-mounted device can determine the target object from the real-time preview image and share it with the first head-mounted device, so that the first head-mounted device generates the prompt information according to the real-time preview image. Moreover, it should be understood that "collecting the first image" in the present disclosure does not mean "shooting the first image", and a shooting action may have been completed before receiving the target information or may be performed after receiving the target information. The present disclosure does not limit a time point of collecting the first image.

In an embodiment, generating the device movement indication information for the target object includes: generating the device movement indication information according to a relative position relationship between the first head-mounted device and the second head-mounted device, a separation distance between the second head-mounted device and the target object, and a position of the target object in the second image. Acquiring the relative position relationship between the first head-mounted device and the second head-mounted device includes acquiring posture information of each head-mounted device and acquiring position information between head-mounted devices. The posture information may be acquired by a posture sensor carried by the head-mounted device, and the posture sensor may include a motion sensor such as a three-axis gyroscope, a three-axis accelerometer, a three-axis electronic compass, which records information such as a rotation angle, a moving direction, a moving distance of the head-mounted device to determine respective shooting orientations of the first head-mounted and the second head-mounted. The position information between the head-mounted devices includes a distance between the first head-mounted device and the second head-mounted device, relative orientation information between the first head-mounted device and the second head-mounted device. The position information between the head-mounted devices may be obtained by detecting absolute position coordinates of the first head-mounted device and the second head-mounted device through GPS or Beidou and calculating relative position information of the first head-mounted device and the second head-mounted device according to the absolute position coordinates, or by calculating the distance and orientation between the first head-mounted device and the second head-mounted device using a positioning algorithm according to RFID (Radio Frequency Identification) signal strength, a phase and other parameters received by the head-mounted device by utilizing NFC (Near Field Communication) technology, or by estimating the distance according to strength changes of transmitted and received signals of a Bluetooth module in the head-mounted device through BLE (Bluetooth Low Energy) technology, which is not limited in the present disclosure. The position information between the head-mounted devices may be detected by the first head-mounted device, or the second head-mounted device can detect the first head-mounted device and send a detection result to the first head-mounted device, which is not limited in the present disclosure. Both shooting parameter information of the head-mounted devices and the position information between the head-mounted devices will have a great impact on the shot image contents. For example, if the separation distance between the second head-mounted device and the target object is changed while keeping respective line of sight angles of the first head-mounted device and the second head-mounted device unchanged, the moving direction and moving distance of the first head-mounted device indicated in the generated prompt information may also be changed. Therefore, by simultaneously considering the relative position relationship between the head-mounted devices, the separation distance between the second head-mounted device and the target object, and the position of the target object in the second image, the direction in which the first head-mounted device needs to move to shoot the target object can be determined more accurately.

It can be seen from the above technical solution provided by the present disclosure that by receiving the target information determined by other head-mounted device and generating the prompt information for the target object according to the collected image, the head-mounted device prompts the user about the target object, or prompts the user to move the head-mounted device towards the target object, so that users wearing different head-mounted devices can share the concerned target object in the same scenario, improving the interaction experience between users.

Figure 2:
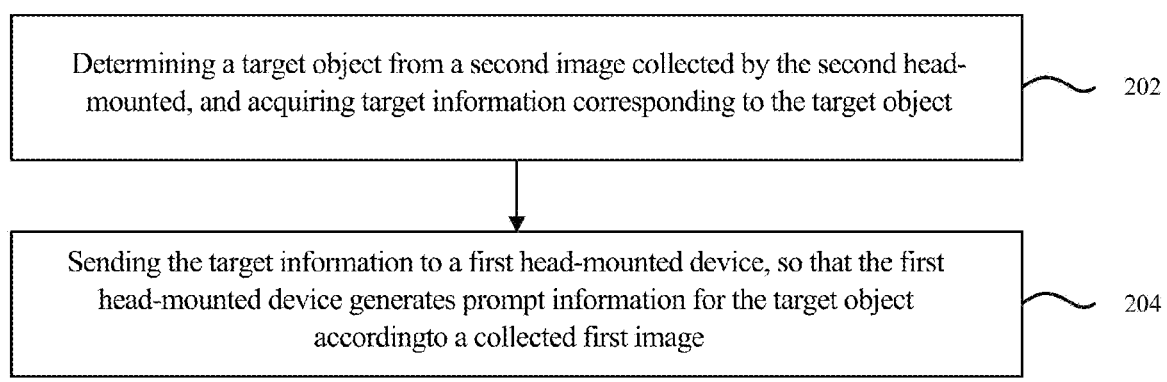
FIG. 2 is a flowchart of another object sharing method according to an exemplary embodiment of the present disclosure.

FIG. 2 is a flowchart of another object sharing method according to an exemplary embodiment of the present disclosure. As shown in FIG. 2, the method is applied to a second head-mounted device and can include the following steps.

Step 202: determining a target object from a second image collected by the second head-mounted, and acquiring target information corresponding to the target object.

In an embodiment, determining the target object from the second image collected by the second head-mounted device includes: determining, according to a detected user trigger operation, the target object selected by a user. For example, the head-mounted device can display a preview image shot by a current lens to the user, and the user can directly click the target object that he/she wants to shoot in the preview image through a touch operation; or, the head-mounted device can track the user's eyeballs and determine a focus point of the user's line of sight on the preview image, and determine an object where the line of sight stays as the target object when the line of sight stays for a preset time; or, the head-mounted device can determine the target object according to a received user's oral content, for example, the user only needs to dictate "pine tree", and the head-mounted device can determine the "pine tree" in the preview image as the target object based on semantic analysis and image content analysis. It should be understood that the target object confirmation methods are only illustrative here, and the present disclosure does not limit this.

In an embodiment, determining the target object from the second image collected by the second head-mounted device includes: determining, according to a preset object feature in the second head-mounted device, the target object matching the object feature. For example, the head-mounted device is preset with object features, such as human body features, building features, natural scene features, etc. When the head-mounted device is in a shooting function and a lens captures a scene consistent with a preset object feature, the scene can be automatically determined as the target object. It should be understood that the target object confirmation method is only illustrative here, and the present disclosure does not limit this.

In an embodiment, the target object includes a dynamic object with a movable position and/or a static object with a fixed position. When the target object is the dynamic object with the movable position, the target object is tracked in real time according to feature information of the target object during the shooting process to acquire a real-time position of the target object in the second image. When the target object is the static object with the fixed position, a real-time position of the static object can be determined according to movement information of the head-mounted device and the position of the static object in the second image when collecting the second image. When the target object includes both the dynamic object with the movable position and the dynamic object with the fixed position, the head-mounted device can choose to track each target object in real time, or can choose to track only the position of the dynamic object in real time when the head-mounted device is not moved, and update the position of the static object according to the movement after moving the head-mounted device. By updating the position information of the target object in time, the head-mounted device can determine a direction of the prompt information according to the position of the target object in the second image and an area in the second image which corresponds to the first image.

In an embodiment, there may be one or more target objects for determining and prompting the position, which is not limited in the present disclosure. For example, the head-mounted device is preset with multiple object features. Under the shooting function, the lens captures multiple scenes consistent with the preset object features, and multiple scenes can be automatically determined as target objects and their own prompt information can be generated. For example, different target objects such as "human body" and "nature" can be identified with different labels in prompt messages, so that the user can move the head-mounted device according to their own needs and corresponding prompts.

In an embodiment, for a specific content of the target information, please refer to relevant description of step 102 in the embodiment shown in FIG. 1, which will not be repeated here.

Step 204: sending the target information to a first head-mounted device, so that the first head-mounted device generates prompt information for the target object according to a collected first image.

In an embodiment, for an operation principle of the first head-mounted device generating the prompt information for the target object according to the collected first image, please refer to relevant description of step 104 in the embodiment shown in FIG. 1, which will not be repeated here.

It can be seen from the above technical solution provided by the present disclosure that by sending the determined target object to other head-mounted device so that the head-mounted device can prompt the user about the target object, users wearing different head-mounted devices can share the concerned target object in the same scenario, improving the interaction experience between users.

A method for prompting object position provided by an embodiment of the present disclosure is described in detail below in combination with the accompanying drawings and application scenarios.

Figure 3:
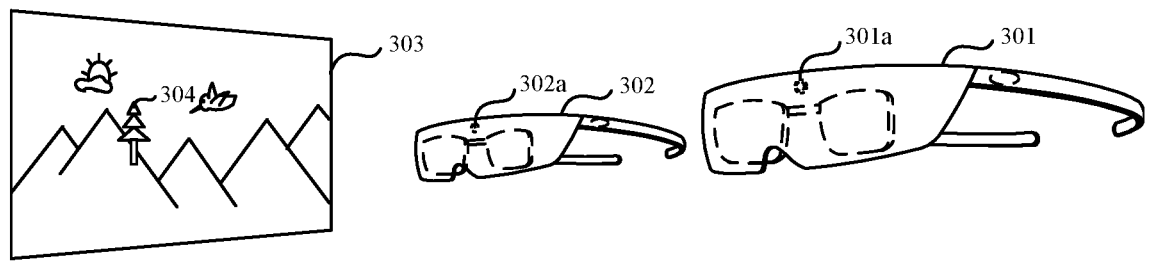
FIG. 3 is a schematic diagram of a shooting scenario of a head-mounted device according to an embodiment of the present disclosure.

FIG. 3 is a schematic diagram of a shooting scenario of a head-mounted device according to an embodiment of the present disclosure. Taking smart glasses as an example, the present disclosure will introduce in detail the method for prompting object position provided in the present disclosure. As shown in FIG. 3, smart glasses 301 carry a camera 301*a*, smart glasses 302 carry a camera 302*a*, and the smart glasses 301 and the smart glasses 302 simultaneously shoot a target scene 303.

Figure 4:
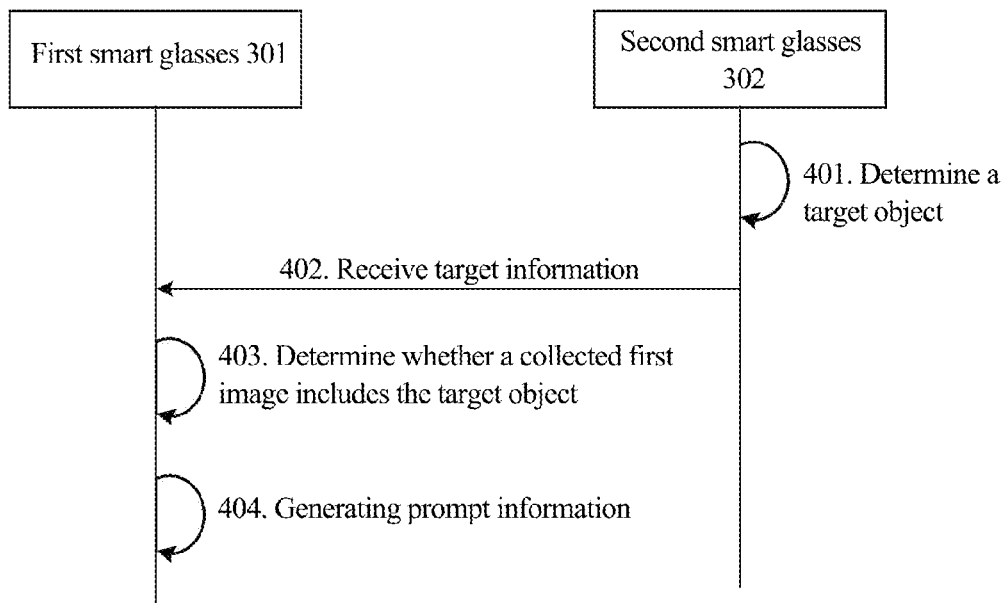
FIG. 4 is a flowchart of an object sharing method according to an embodiment of the present disclosure.

Still taking the shooting scenario shown in FIG. 3 as an example, the smart glasses 302 can send determined target object information to the smart glasses 301, so that the smart glasses 301 generates prompt information for the target object, so as to realize object sharing. FIG. 4 is a flowchart of an object sharing method according to an embodiment of the present disclosure. As shown in FIG. 4, a process of prompting the position of the target object to assist telephoto shooting includes the following steps.

Step 401, the second smart glasses 302 determine the target object.

In an implementation, the smart glasses 302 may determine the target object selected by a user according to a detected user trigger operation. Still taking FIG. 3 as an example, in an embodiment, the smart glasses 302 displays a collected second image to the user under a shooting function. The user can touch a touch area on a frame of the smart glasses 302 and click a "tree" in the second image to take it as a target object 304 "tree" that he/she wants to shoot.

In an implementation, the smart glasses 302 may also determine a target object matching an object feature according to the object feature preset in the head-mounted device, and there may be multiple determined target objects. Multiple object features such as "plant" and "animal" are preset in the smart glasses 302. When the shooting function is activated, the smart glasses 302 detect whether there are objects matching the preset object features in a target scene 303, and automatically determine a "tree" and a "bird" in the scene as the target object 304 and a target object 305.

The target information is used to indicate the target object, including feature information and/or position information of the target object. The target information is used to indicate the target object 304 "tree".

In an implementation, the second smart glasses 302 may determine the target object selected by the user according to the detected user trigger operation. Still taking FIG. 3 as an example, the second smart glasses 302 display a preview picture of the scene 303 to the user under the shooting function, detect that the user's line of sight stays on the "tree" in the preview image for 3 seconds, and determine that the "tree" in the scene 303 is the target object 304 that the user wants to share.

Step 402, the first smart glasses 301 receives the target information sent by the second smart glasses 302.

The first smart glasses 301 receive the target information corresponding to the target object acquired by the second smart glasses 302.

Step 403, the first smart glasses 301 judges whether a collected first image includes the target object.

The first smart glasses 301 compare the collected first image with the target information according to the received target information to judge whether the collected first image includes the target object.

Step 404, generating prompt information.

Figure 5:
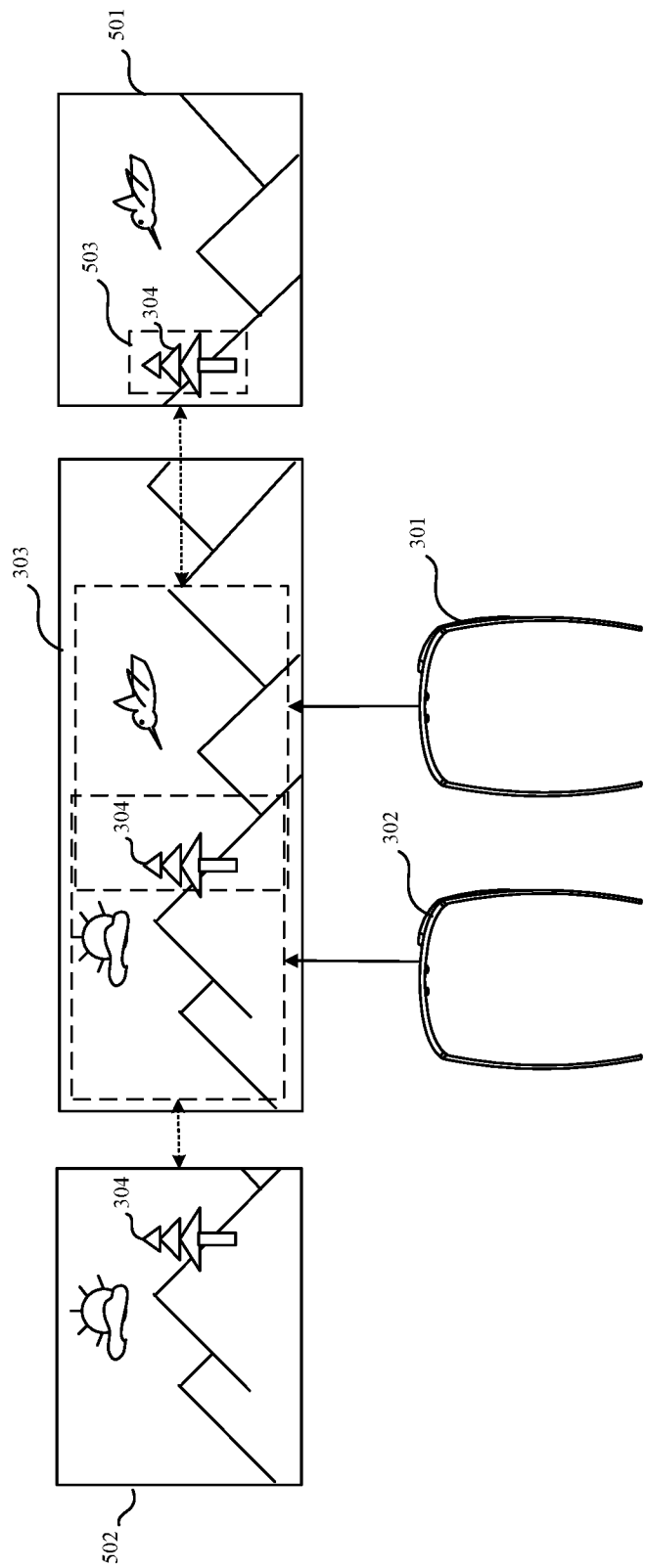
FIG. 5 is a prompt interface of intelligent glasses sharing object according to an embodiment of the present disclosure.

In a case that the first image collected by the first smart glasses 301 includes the target object, the smart glasses 301 marks the target object in the collected first image. FIG. 5 is a prompt interface of intelligent glasses sharing object according to an embodiment of the present disclosure. The first smart glasses 301 shoot a first image 501 for the target scene 303, make a match for the target information in the first image 501 after receiving the target information of the target object 304 "tree", determine that the first image 501 shot by the first smart glasses 301 includes the target object 304, and generates a dotted box around the target object 304 "tree" to identify its corresponding area 503 to prompt a user of the smart glasses 301 that the "tree" selected by the box is the target object that the user of the smart glasses 302 wants to share.

Figure 6:
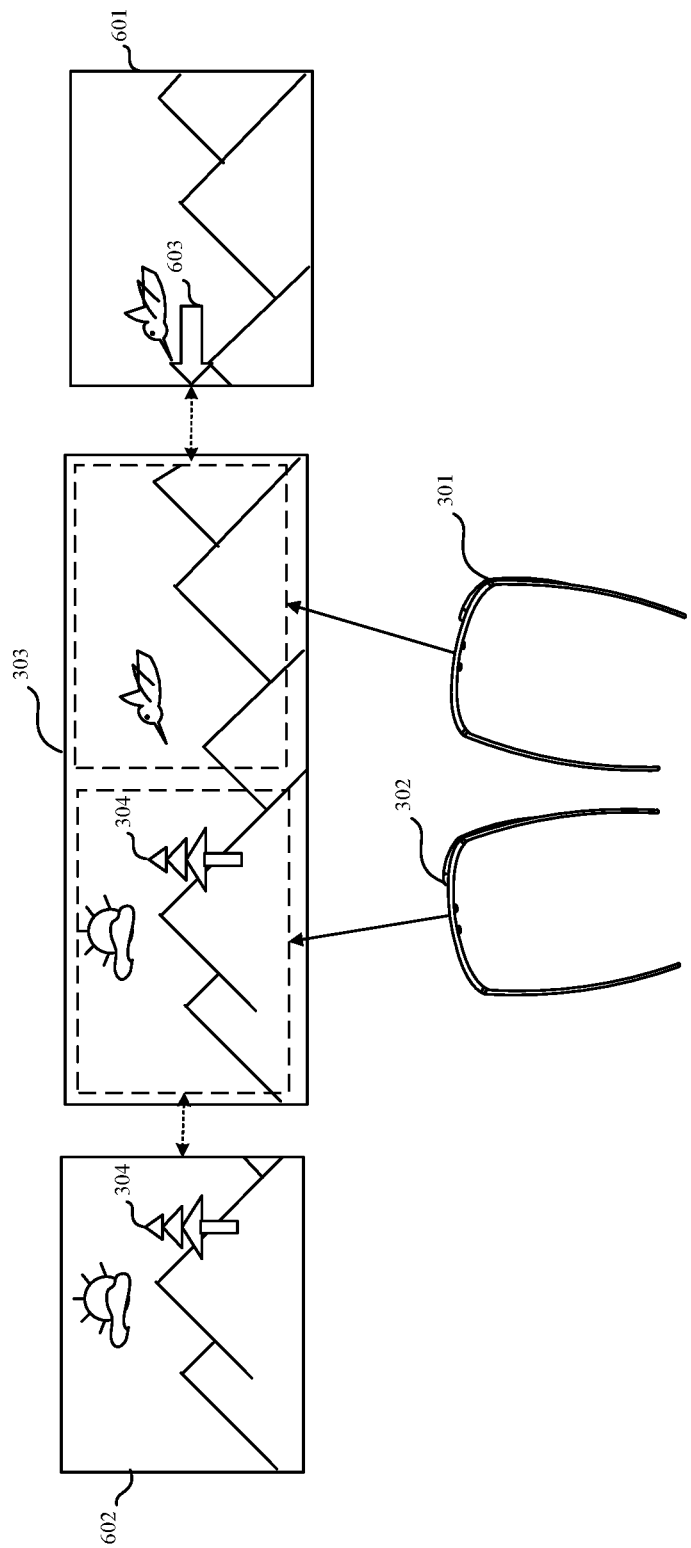
FIG. 6 is a schematic diagram of prompt display of a scenario according to an embodiment of the present disclosure.

In a case that the first image collected by the first smart glasses 301 does not include the target object, the first smart glasses 301 can obtain a relative position relationship between the first smart glasses 301 and the second smart glasses 302, a separation distance between the second smart glasses 302 and the target object, and a position of the target object in the second image collected by the second smart glasses 302, and generate, according to this, device movement indication information for the target object to indicate to the user about moving the first smart glasses 301, so that a first image re-collected by the first smart glasses 301 after moving includes the target object. FIG. 6 is a schematic diagram of prompt display of a scenario according to an embodiment of the present disclosure. The first smart glasses 301 are located on the right side of the second smart glasses 302. The first smart glasses 301 face right and front to shoot the target scene 303 to obtain a first image 601, and the second smart glasses 302 face left and front to shoot the target scene 303 to obtain a second image 602. In this scenario, when no match for the target information of the target object 304 "tree" is found in the first image 601 shot by the first smart glasses 601, the first smart glasses 301 can calculate a position relationship of the target object 304 "tree" relative to the currently collected first image according to a position direction and distance between the first smart glasses 301 and the second smart glasses 302, biased angles of respective shooting lenses of the first smart glasses 301 and the second smart glasses 302, a separation distance between the second smart glasses 302 and the target object, and a position of the target object 304 "tree" in the second image shot by the second smart glasses, and generate a prompt arrow 603 pointing to the left in the first image 601 to prompt the user that the target object shared by the second smart glasses 302 is located on the left side of the first image 601 currently shot by the first smart glasses 301, and to indicate to the user about moving the first smart glasses 301 to the left, so that the moved first smart glasses 301 can capture the target object 304 "tree".

Figure 7:
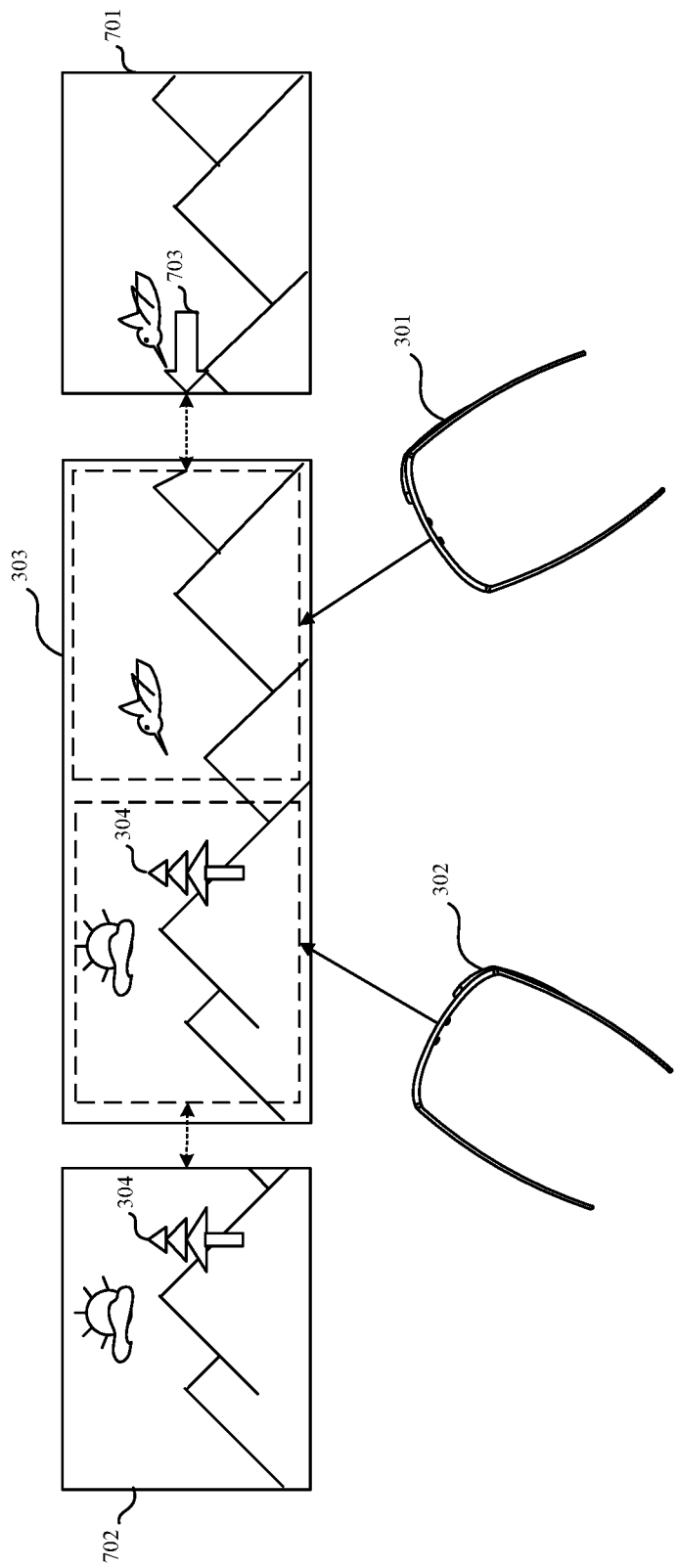
FIG. 7 is a schematic diagram of prompt display of another scenario according to an embodiment of the present disclosure.

FIG. 7 is a schematic diagram of prompt display of another scenario according to an embodiment of the present disclosure. The first smart glasses 301 are located on the right side of the second smart glasses 302. The first smart glasses 301 face left and front to shoot the target scene 303 to obtain a first image 701, the second smart glasses 302 face right and front to shoot the target scene 303 to obtain a second image 702, and the shooting line of sight of the first smart glasses 301 and the shooting line of sight of the second smart glasses 302 do not intersect. In this scenario, when no match for the target information of the target object 304 "tree" is found in the first image 701 shot by the first smart glasses 701, the first smart glasses 301 can calculate a position relationship of the target object 304 "tree" relative to the currently collected first image according to a position direction and distance between the first smart glasses 301 and the second smart glasses 302, biased angles of the respective shooting lenses of the first smart glasses 301 and the second smart glasses 302, a separation distance between the second smart glasses 302 and the target object, and a position of the target object 304 "tree" in the second image shot by the second smart glasses, and generate a prompt arrow 703 pointing to the left in the first image 701 to prompt the user that the target object shared by the second smart glasses 302 is located on the left side of the first image 701 currently shot by the first smart glasses 301, and to indicate to the user about moving the first smart glasses 301 to the left, so that the moved first smart glasses 301 can capture the target object 304 "tree".

Figure 8:
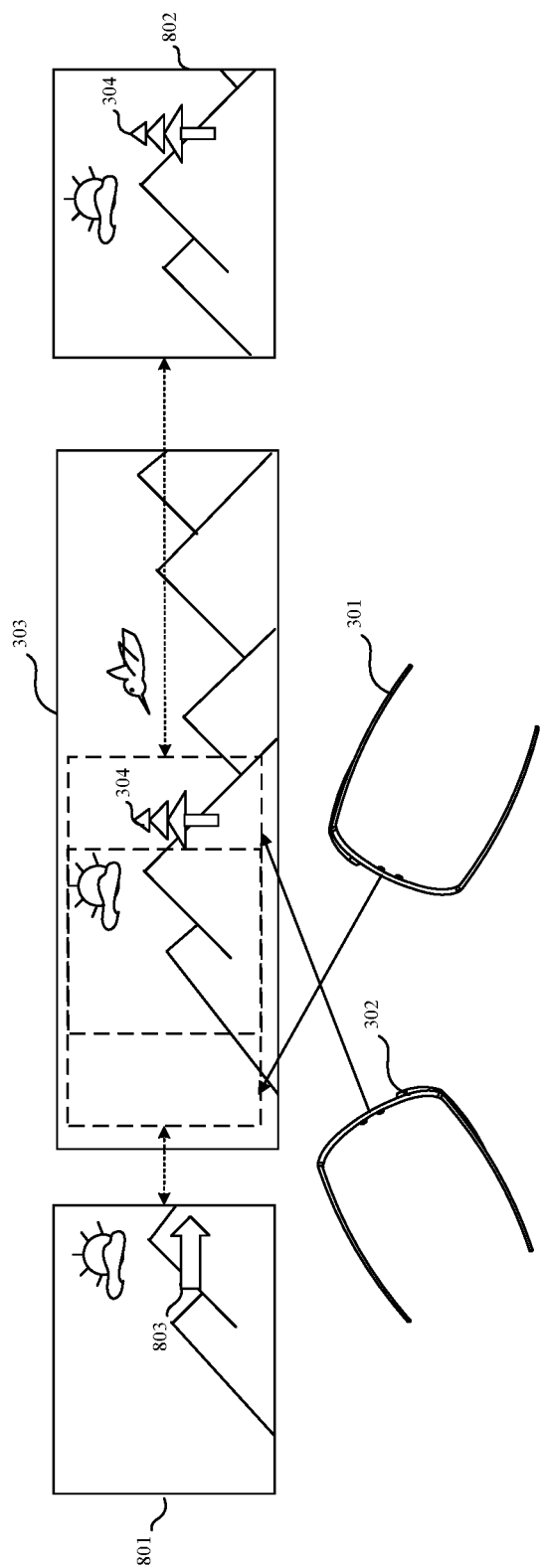
FIG. 8 is a schematic diagram of prompt display of another scenario according to an embodiment of the present disclosure.

FIG. 8 is a schematic diagram of prompt display of another scenario according to an embodiment of the present disclosure. The first smart glasses 301 are located on the right side of the second smart glasses 302. The first smart glasses 301 face left and front to shoot the target scene 303 to obtain a first image 801, the second smart glasses 302 face right and front to shoot the target scene 303 to obtain a second image 802, and the shooting line of sight of the first smart glasses 301 and the shooting line of sight of the second smart glasses 302 intersect. In this scenario, when no match for the target information of the target object 304 "tree" is found in the first image 801 shot by the first smart glasses 801, the first smart glasses 301 can calculate a position relationship of the target object 304 "tree" relative to the currently collected first image according to a position direction and distance between the first smart glasses 301 and the second smart glasses 302, biased angles of the respective shooting lens of the first smart glasses 301 and the second smart glasses 302, a separation distance between the second smart glasses 302 and the target object, and a position of the target object 304 "tree" in the second image shot by the second smart glasses, and generate a prompt arrow 803 pointing to the right in the first image 801 to prompt the user that the target object shared by the second smart glasses 302 is located on the right side of the first image 801 currently shot by the first smart glasses 301, and to indicate to the user about moving the first smart glasses 301 to the right so that the moved first smart glasses 301 can capture the target object 304 "tree".

Figure 9:
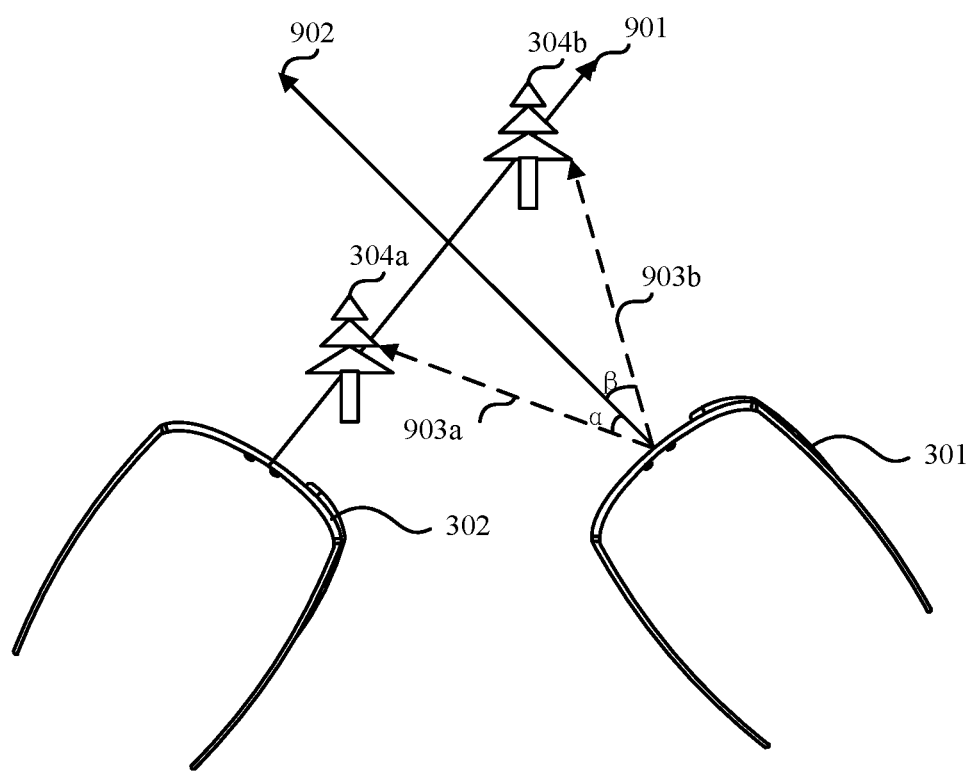
FIG. 9 is a schematic diagram of a line of sight scenario according to an embodiment of the present disclosure.

In addition to the above-mentioned examples of different object sharing scenarios due to changes in the line of sight angles, in a case that the line of sight angle of the first smart glasses 301 and the line of sight angle of the second smart glasses 302 remain unchanged, a separation distance between the target object and the second smart glasses 302 will also affect the prompt information generated by the first smart glasses. FIG. 9 is a schematic diagram of a line of sight scenario according to an embodiment of the present disclosure. A line of sight 901 is a current line of sight direction of the first smart glasses 301 and a line of sight 902 is a current line of sight direction of the second smart glasses 302. When the separation distance between the target object and the second smart glasses 302 is relatively short, such as a target object 304a, prompt information needs to be generated to indicate rotating the first smart glasses to the left by an angle of a until a line of sight 903a, in which case a first image including the target object 304a can be collected; when the separation distance between the target object and the second smart glasses 302 is relatively long, such as a target object 304b, prompt information needs to be generated to indicate rotating the first smart glasses to the right by an angle of β until a line of sight 903b, in which case a first image including the target object 304b can be collected.

Figure 10:
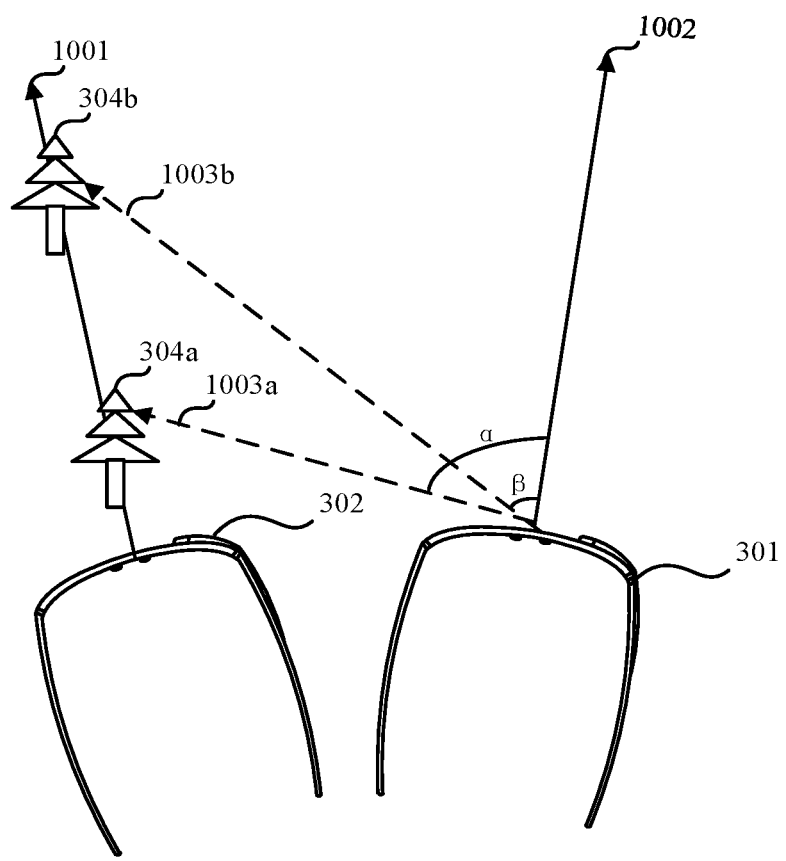
FIG. 10 is a schematic diagram of another line of sight scenario according to an embodiment of the present disclosure.

FIG. 10 is a schematic diagram of another line of sight scenario according to an embodiment of the present disclosure. A line of sight 1001 is the current line of sight direction of the first smart glasses 301, and a line of sight 1002 is the current line of sight direction of the second smart glasses 302. When the separation distance between the target object and the second smart glasses 302 is relatively short, such as the target object 304a, prompt information needs to be generated to indicate rotating the first smart glasses to the left by an angle of a until a line of sight 1003a, in which case the first image including the target object 304a can be collected; when the separation distance between the target object and the second smart glasses 302 is relatively long, such as the target object 304b, prompt information needs to be generated to indicate rotating the first smart glasses to the left by an angle of β until a line of sight 1003b, in which case the first image including the target object 304b can be collected.

Corresponding to the above method embodiments, the specification also provides an apparatus embodiment.

Figure 11:
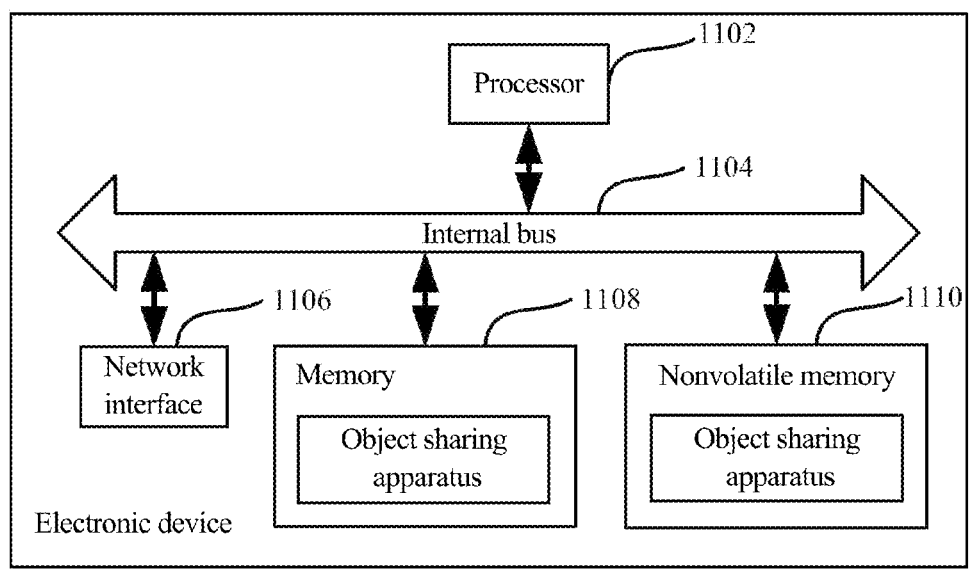
FIG. 11 is a schematic structural diagram of an object sharing electronic device according to an exemplary embodiment of the present disclosure.

FIG. 11 is a schematic structural diagram of an object sharing electronic device according to an exemplary embodiment of the present disclosure. Referring to FIG. 11, at a hardware level, an electronic device includes a processor 1102, an internal bus 1104, a network interface 1106, a memory 1108 and a nonvolatile memory 1110, and of course may also include hardware required for other services. The processor 1102 reads a corresponding computer program from the nonvolatile memory 1110 into the memory 1108 and then runs the same, forming an apparatus for solving the object sharing problem at the logical level. Of course, in addition to the software implementation, the present disclosure does not exclude other implementations, such as logic devices or a combination of software and hardware, etc., that is to say, the executive entity of the following processing flow is not limited to the logic units, but may also be hardware or logic devices.

Figure 12:
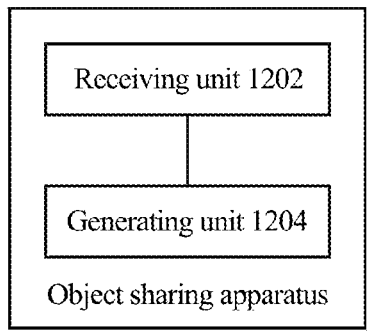
FIG. 12 is a block diagram of an object sharing apparatus according to an exemplary embodiment of the present disclosure.

FIG. 12 is a block diagram of an object sharing apparatus according to an exemplary embodiment of the present disclosure. Referring to FIG. 12, the apparatus includes a receiving unit 1202 and a generating unit 1204, where:

the receiving unit 1202 is configured to receive target information sent by a second head-mounted device, where the target information is used to indicate a target object included in a second image collected by the second head-mounted device;

the generating unit 1204 is configured to generate prompt information for the target object according to a first image collected by the first head-mounted device.

In an implementation, generating the prompt information for the target object according to the first image collected by the first head-mounted device includes: in a case that the first image collected by the first head-mounted device includes the target object, marking the target object in the first image.

In an implementation, generating the prompt information for the target object according to the first image collected by the first head-mounted device includes: in a case that the first image collected by the first head-mounted device does not include the target object, generating device movement indication information for the target object, where the indication information is used to indicate moving the first head-mounted device, so that a first image re-collected by the first head-mounted device after moving includes the target object.

In an implementation, generating the device movement indication information for the target object includes: generating the device movement indication information according to a relative position relationship between the first head-mounted device and the second head-mounted device, a separation distance between the second head-mounted device and the target object, and a position of the target object in the second image.

Figure 13:
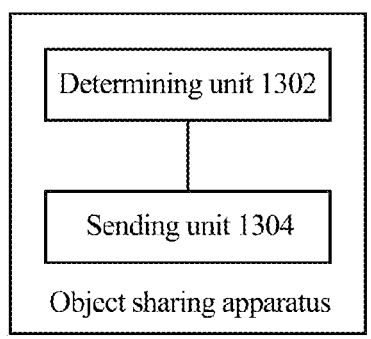
FIG. 13 is a block diagram of another object sharing apparatus according to an exemplary embodiment of the present disclosure.

FIG. 13 is a block diagram of another object sharing apparatus according to an exemplary embodiment of the present disclosure. Referring to FIG. 13, the apparatus includes a determining unit 1302 and a sending unit 1304, where:

the determining unit 1302 is configured to determine a target object from a second image collected by a second head-mounted device, and acquire target information corresponding to the target object;

the sending unit 1304 is configured to send the target information to a first head-mounted device, so that the first head-mounted device generates prompt information for the target object according to a collected first image.

In an implementation, determining the target object from the second image collected by the second head-mounted device includes: determining, according to a detected user trigger operation, the target object selected by a user; or, determining, according to a preset object feature in the second head-mounted device, the target object matching the object feature; where the target object includes a dynamic object with a movable position and/or a static object with a fixed position.

For the implementing process of the functions and roles of the units in the above apparatuses, details can be found in the implementing process of the corresponding steps in the above methods, which will not be repeated here.

For the apparatus embodiments, since they basically correspond to the method embodiments, please refer to the parts of description of the method embodiments for relevant parts. The apparatus embodiments described above are only schematic, in which the units described as separate components may or may not be physically separated, and the components shown as units may or may not be physical units, that is, they may be located in one place or distributed to multiple network units. Some or all of the modules can be selected according to actual needs to achieve the purpose of the solutions of the present disclosure. Those of ordinary skill in the art can understand and implement them without creative effort.

In an exemplary embodiment, a non-transitory computer-readable storage medium including instructions is also provided, such as a memory including instructions, and the instructions may be executed by a processor of an object sharing apparatus to implement the method as described in any of the above embodiments, for example, the method may include:

receiving target information sent by a second head-mounted device, where the target information is used to indicate a target object included in a second image collected by the second head-mounted device; generating prompt information for the target object according to a first image collected by a first head-mounted device.

The non-transitory computer-readable storage medium may be a ROM, a random access memory (RAM), a CD-ROM, a magnetic tape, a floppy disk, an optical data storage device and the like, which is not limited in the present disclosure.

The above are only preferred embodiments of the present disclosure which are not intended to limit the present disclosure. Any modification, equivalent replacement, improvement and the like, which are made within the spirits and principles of the present disclosure, shall be included in the scope of protection of the present disclosure.

What is claimed is:

1. An object sharing method, applied to a first head-mounted device, wherein the method comprises:
receiving target information sent by a second head-mounted device, wherein the target information is used to indicate a target object comprised in a second image collected by the second head-mounted device;
generating prompt information for the target object according to a first image collected by the first head-mounted device;
generating the prompt information for the target object according to the first image collected by the first head-mounted device comprises:
in a case that the first image collected by the first head-mounted device does not comprise the target object, generating device movement indication information for the target object, wherein the device movement indication information is used to indicate moving the first head-mounted device, so that a first image re-collected by the first head-mounted device after moving comprises the target object;
wherein generating the device movement indication information for the target object comprises:
generating the device movement indication information according to a relative position relationship between the first head-mounted device and the second head-mounted device, a separation distance between the second head-mounted device and the target object, and a position of the target object in the second image.

2. The method according to claim 1, wherein generating the prompt information for the target object according to the first image collected by the first head-mounted device comprises:
in a case that the first image collected by the first head-mounted device comprises the target object, marking the target object in the first image.

3. A non-transitory computer-readable storage medium, having computer instructions stored thereon, wherein steps of the method according to claim 1 are implemented when the instructions are executed by a processor.

4. The storage medium according to claim 3, wherein generating the prompt information for the target object according to the first image collected by the first head-mounted device comprises:
in a case that the first image collected by the first head-mounted device comprises the target object, marking the target object in the first image.

5. An object sharing method, applied to a second head-mounted device, wherein the method comprises:
determining a target object from a second image collected by the second head-mounted device, and acquiring target information corresponding to the target object;
sending the target information to a first head-mounted device, so that the first head-mounted device generates prompt information for the target object according to a collected first image, wherein in a case that the first image collected by the first head-mounted device does not comprise the target object, the first head-mounted device generates device movement indication information for the target object according to a relative position relationship between the first head-mounted device and the second head-mounted device, a separation distance between the second head-mounted device and the target object, and a position of the target object in the second image, wherein the device movement indication information is used to indicate moving the first head-mounted device, so that a first image re-collected by the first head-mounted device after moving comprises the target object.

6. The method according to claim 5, wherein determining the target object from the second image collected by the second head-mounted device comprises:
determining, according to a detected user trigger operation, the target object selected by a user; or, determining, according to a preset object feature in the second head-mounted device, the target object matching the object feature;
wherein the target object comprises a dynamic object with a movable position and/or a static object with a fixed position.

7. An object sharing apparatus, applied to a second head-mounted device, comprising: a processor and a memory storing processor executable instructions; wherein the processor is configured to implement the method according to claim 5 by running the executable instructions.

8. The apparatus according to claim 7, wherein the processor is specifically configured to:
determine, according to a detected user trigger operation, the target object selected by a user; or, determine, according to a preset object feature in the second head-mounted device, the target object matching the object feature;
wherein the target object comprises a dynamic object with a movable position and/or a static object with a fixed position.

9. A non-transitory computer-readable storage medium, having computer instructions stored thereon, wherein steps of the method according to claim 5 are implemented when the instructions are executed by a processor when the instructions are executed by a processor.

10. The storage medium according to claim 9, wherein determining the target object from the second image collected by the second head-mounted device comprises:
determining, according to a detected user trigger operation, the target object selected by a user; or, determining, according to a preset object feature in the second head-mounted device, the target object matching the object feature;

wherein the target object comprises a dynamic object with a movable position and/or a static object with a fixed position.

11. An object sharing apparatus, applied to a first head-mounted device, comprising: a processor and a memory storing processor executable instructions; wherein, the processor, when running the executable instructions, is configured to:

receive target information sent by a second head-mounted device, wherein the target information is used to indicate a target object comprised in a second image collected by the second head-mounted device;

generate prompt information for the target object according to a first image collected by the first head-mounted device, wherein the processor is specifically configured to:

in a case that the first image collected by the first head-mounted device does not comprise the target object, generate device movement indication information for the target object, wherein the device movement indication information is used to indicate moving the first head-mounted device, so that a first image re-collected by the first head-mounted device after moving comprises the target object;

wherein the processor is specifically configured to:

generate the device movement indication information according to a relative position relationship between the first head-mounted device and the second head-mounted device, a separation distance between the second head-mounted device and the target object, and a position of the target object in the second image.

12. The apparatus according to claim 11, wherein the processor is specifically configured to:

in a case that the first image collected by the first head-mounted device comprises the target object, mark the target object in the first image.

* * * * *